(12) United States Patent
Yu et al.

(10) Patent No.: US 6,813,440 B1
(45) Date of Patent: Nov. 2, 2004

(54) BODY SCANNER

(75) Inventors: Wing Man Yu, Kowloon (HK); Keng Po Ng, Kowloon (HK); Man Chi Yan, Kowloon (HK); Hong Bo Gu, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 702 days.

(21) Appl. No.: 09/684,340

(22) Filed: Oct. 10, 2000

(51) Int. Cl.$^7$ .................................................. G03B 29/00
(52) U.S. Cl. ...................... 396/14; 356/618; 250/237 G
(58) Field of Search ...................... 396/14; 250/237 G; 356/618

(56) References Cited

U.S. PATENT DOCUMENTS 4,132,575 A * 1/1979 Suzuki et al. ................. 156/58
4,564,295 A * 1/1986 Halioua ....................... 356/605
6,291,817 B1 * 9/2001 Kobayashi et al. ...... 250/237 G

* cited by examiner

Primary Examiner—David M. Gray
(74) Attorney, Agent, or Firm—Leydig, Voit & Mayer, Ltd.

(57) ABSTRACT

A compact moiré effect body scanner provides 3-D images of a human body for use in making up suitable garments. The scanner includes an elongate projection module with a photographic grid that illuminates the body. An elongate imaging module having a second photographic grid lies alongside the projection module and a digital camera is used to capture images of the body. The scanner is typically about 400 mm long, 400 mm high, and 150 mm wide and can be used in normal room light conditions.

19 Claims, 6 Drawing Sheets

BODY SCANNER

FIELD OF THE INVENTION

The invention relates to body scanners.

BACKGROUND

The invention relates more particularly to photographic body scanners that are capable of forming images or records of a body for use in making up suitable garments. Such records may be used in other fields such a surgery or pathology where 3-dimensional information is required. Although various imaging techniques are known using laser sources and mechanical plotting of images, the present invention is directed to scanners that incorporate projection moiré topography where we have now been found it possible to create scanner systems that are physically compact, relatively low in cost, and require a short scanning distance.

Although various non-contact imaging techniques are known which use a laser or infrared light source, they require time to move the sensors to scan a human body, which also affects the data accuracy. Laser strobe or invisible light spectrum radiation may also cause harm to human eyes and organs.

SUMMARY OF THE INVENTION

It is an object of the invention to overcome or at least reduce these problems.

According to the invention there is provided a compact moiré effect body scanner for generating 3-D images, the scanner including an elongate projection module having a light source, a first objection lens for directing a beam of light from the source along a first central longitudinal axis, a first photographic grid for the beam of light and mounted in a plane at right angles to the first central axis to allow light to illuminate a body to be scanned, and an elongate imaging module adjacent the projection module having a second central longitudinal axis parallel to the first central axis, the imaging module incorporating a second objective lens for receiving reflected from the body, a second photograph grid for the reflected light and mounted in a plane at right angles to the second central axis, and an imaging means for recording the reflected deformed grating from the body captured beyond the second photographic grid.

The imaging means is preferably a digital camera.

The first and second objective lenses preferably have the same focal length and are mounted in a same common plane.

Nodal points of the two objective lenses preferably are separated by the same distance from the respective photographic grids.

BRIEF DESCRIPTION OF DRAWINGS

A compact moiré effect body scanner according to the invention will now be described by way or example with reference to the accompanying drawings in which.

DETAILED DESCRIPTION

Embodiments of the invention comprise a compact design of photographic 3D scanners that are capable of forming accurate moiré topographic images from a human body surface at short distance, in a short duration, and that are light-weight, and low-cost for use in making perfect fit garments. Such records may be used in other fields, such as surgery or pathology where three-dimensional information is required.

Figure 1A:
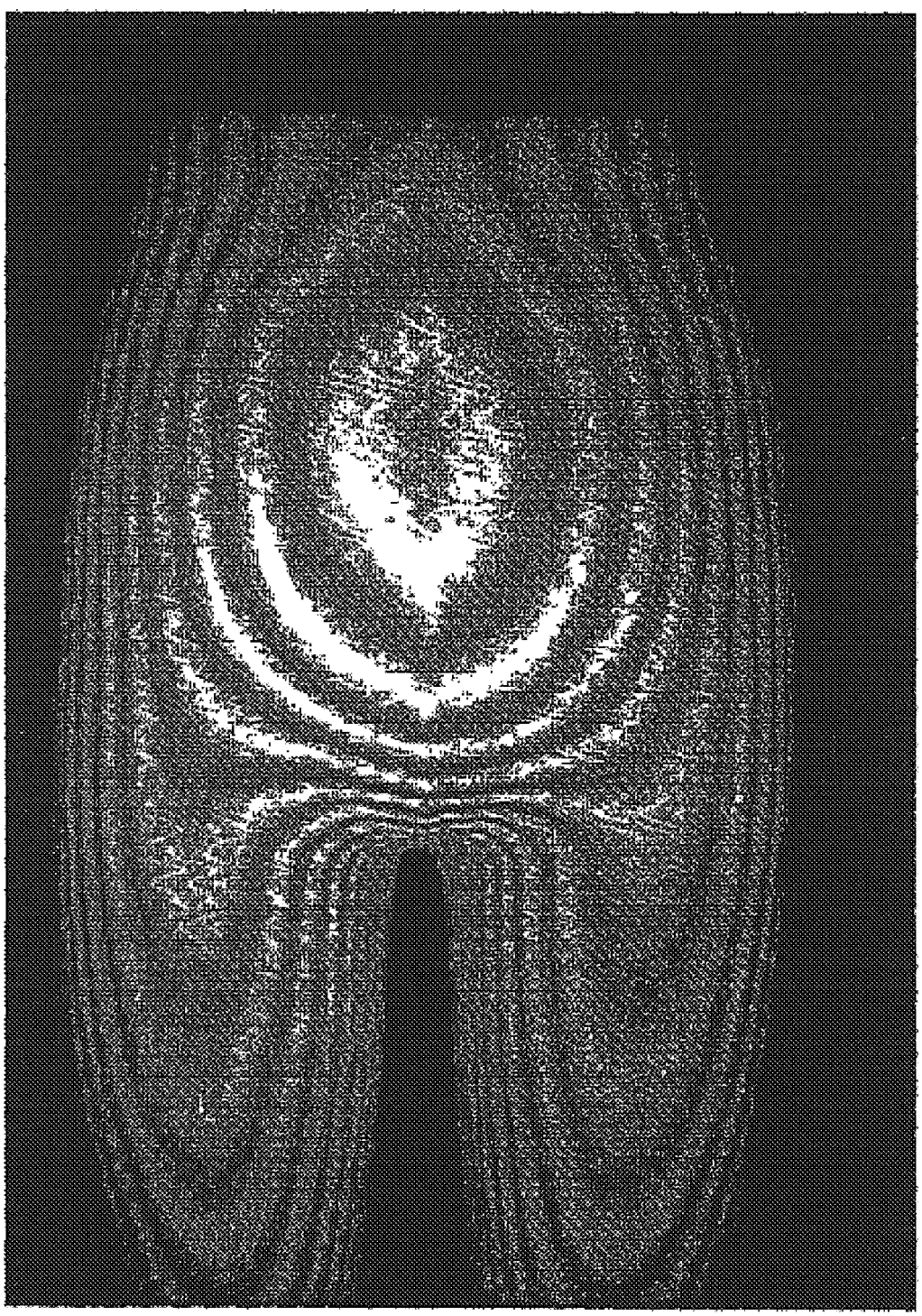
FIGS. 1A, 1B, and 1C are moiré contour pattern images of a front, side and rear view of a human torso.
Figure 1B:
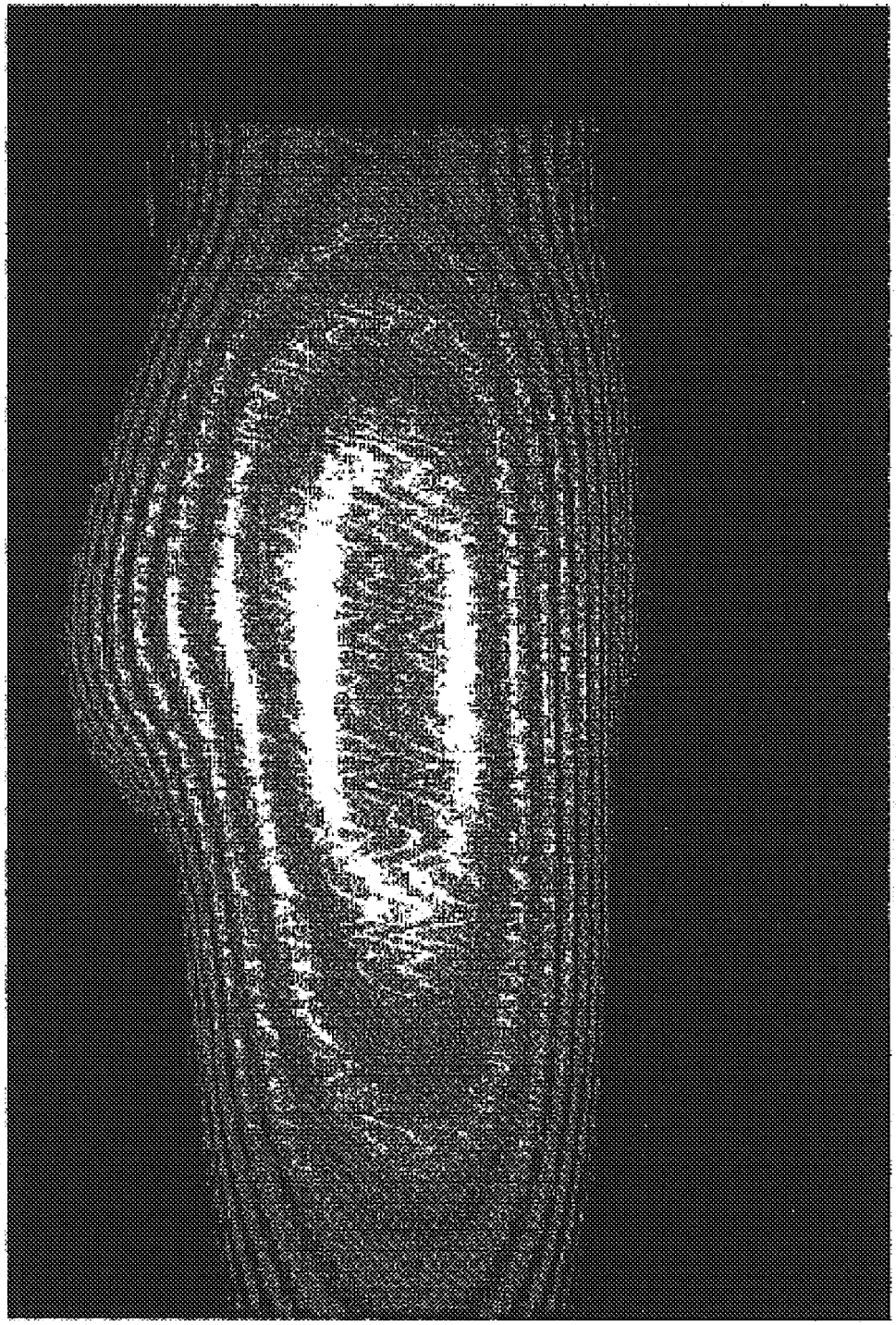
Figure 1C:
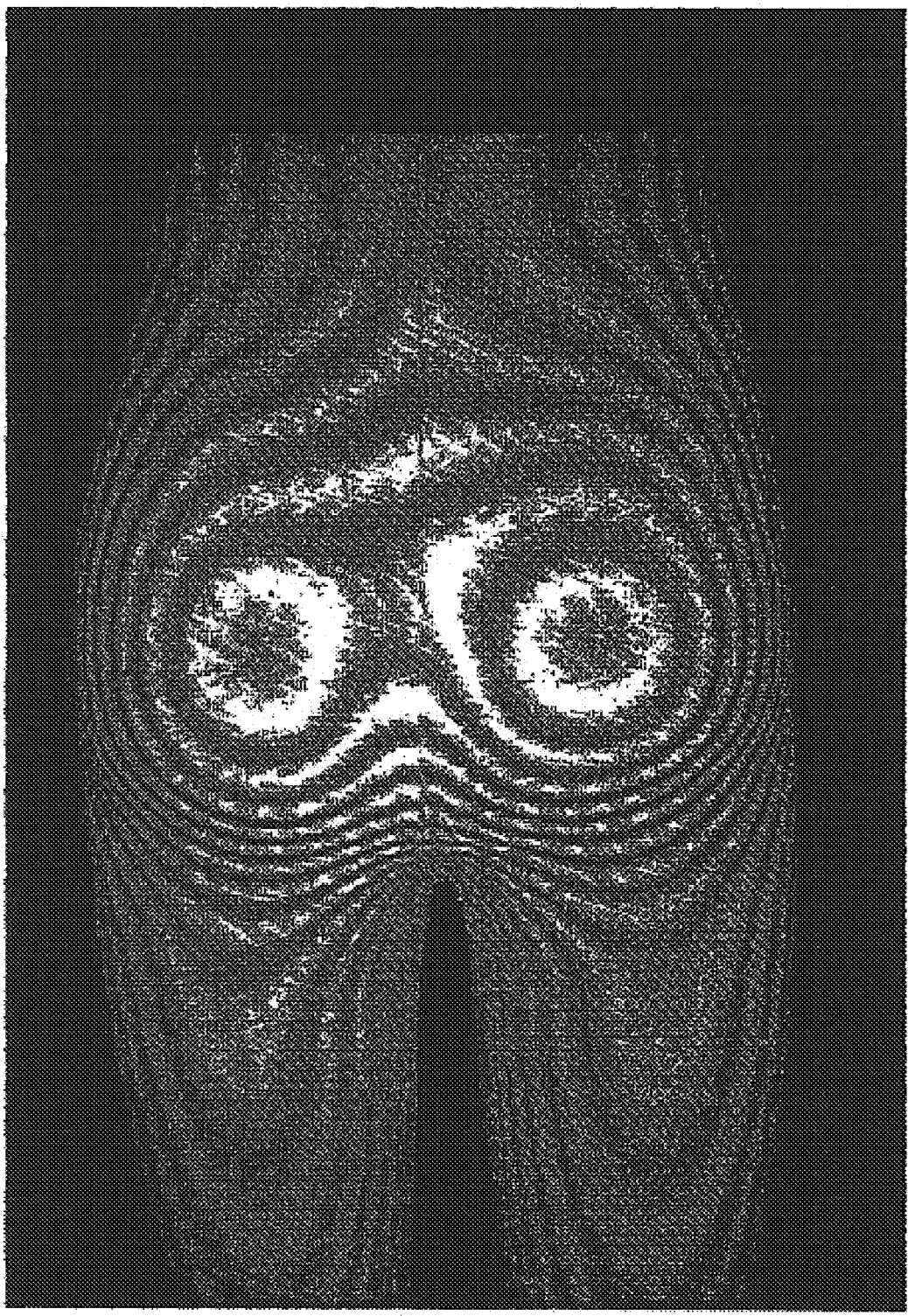

The embodiments of the present invention comprise scanners that modify a technique of projection moiré topography. The basic technique uses optical interference that occurs from two identical high-density gratings. When the reference grating is projected onto the surface of human body with an objective lens, its varying dimension will deform the grid line shadow. This deformed style of grating is then reflected and captured by another identical objective lens simultaneously. When the deformed reference grating passes through the parallel detection grating, the relative displacements of one grating with respect to the other is provided. (see FIGS. 1A, 1B and 1C)

Figure 2:
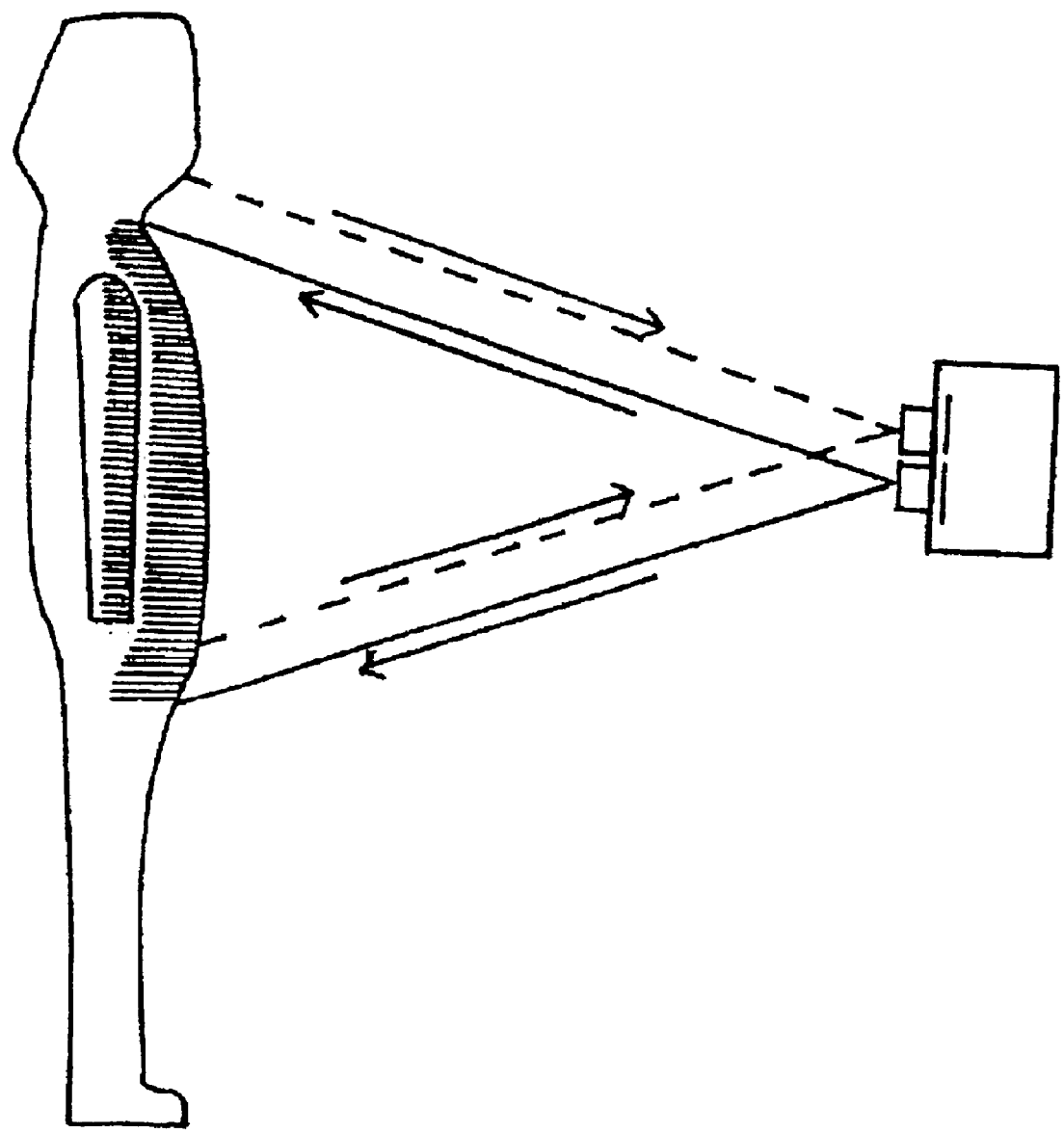
FIG. 2 is a schematic view of a set-up of the scanner to images of a human body.

It is, however, possible for embodiments of the present invention to operate under normal light conditions. High-speed pulse light in the visible spectrum is used as a safe light source. The scanner system can capture 3D human body images from a short distance, up to 0.8 meters (see FIG. 2), quickly, within $1/1500$ second. The scanner is physically compact, light weight and relatively low in cost. Such a design, of a high speed and high quality moiré compact scanner, fulfills the contemporary market requirement. Short focal length objective lenses are used to cover a wider projection area of a field up to 1109.94 mm vertical and 924.95 mm horizontal at a 1200 mm distance. The coverage at 800 mm distance is 721.74 mm vertical and 601.45 mm horizontal.

Figure 3:
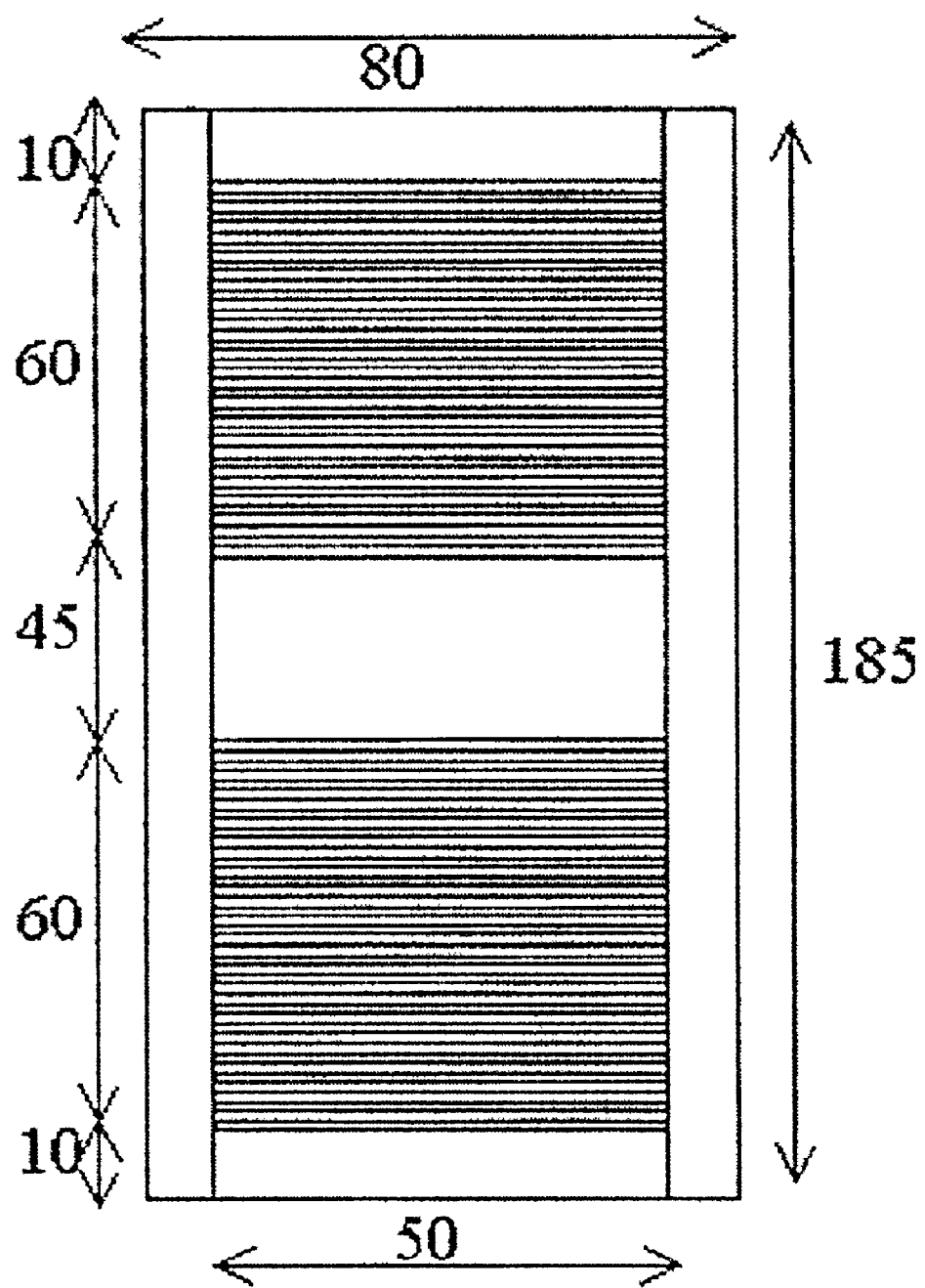
FIG. 3 shows typical high density parallel equal spatial gratings for use in the scanner.

A high density parallel grating (see FIG. 3) is made by using Kodak type #160-01 special glass plate, in order to avoid optical aberration and high light-diffraction factor due to the wide angle of light rays and adjacency of a rear nodal point. Since a light sensitive emulsion layer is less than 5 microns thick, it decreases the optical diffraction rate and increases the resolution and contrast of the moiré contour; this improves sharpness around edges of images. The emulsion is coated on a quality soda lime type optical flat glass base. It is therefore a highly transparent optical glass exhibiting stable dimensions having only 1.5 mm thickness. This will increase image quality and ensure data accuracy To prevent noise resulting from a high fog level index of photographic silver bromide emulsion, a modified photographic film-developing chemical is also applied to achieve a high contrast range of 2.90 at Light Opacity Log θ, which produces low fog level and increases the resolution. Multi-coating is used on each air-glass surface with a thickness of $1/4$ wavelength of the incident light wave within the visible spectrum. This increases the light transmission and reduces reflection.

A flash unit is used to produce 1600 watt seconds of pulse light in the visible spectrum at 400 to 700 nm as a projection light source. Although the light intensity is powerful, it will not incur any harm to the human body. The image capturing duration takes less than $1/1500$ second and so minimizes any adverse effects that would normally be caused by body movement. A piece of UV heat absorption glass and low pass filter is applied to cut off long wave infrared and to control the light wavelength to within 400 to 700 mm. This is used not only to maintain a higher safety factor, but also reduces chromatic aberration due to the light dispersion of optical glass when a wide range of light wavelength passes through the optics. Another purpose of this heat absorption glass is to prevent changes in the dimension and density of the glass plates, especially for the projection grid. The design of image optical system that transfers the non-parallel light rays of contour images into the objective lens requires special mention. This is called the "field lens" (optical transfer component) which has an aspherical curved surface to correct some optical aberration such as spherical aberration, barrel or pincushion distortion and field curvature which is caused by the objective lens. The light rays are collected by a group of Fresnel lenses so as to condense the light passing through the photographic grid plane. High-density parallel reference gratings with equally spaced lines and gaps are projected onto a human body by the objective lens. The lens aperture is predetermined to produce sufficient depth-of-field to cover a required part of the human body. The reflecting grating image from the body is deformed due to its varying dimensions and is simultaneously captured by the other objective lens. The gratings have the same lens aperture for obtaining identical depth-of-field, depth-of focus and image magnification as the projection system. The deformed grating image passes through the detection grid that is located at the focal plane of the image capture objective lens. The optical interference occurs and forms a moiré contour map.

Since the angle of light rays of the contour map from two objective lenses are not in a parallel point source condition, the scanner cannot capture the full frame image by using the other objective lens of a digital camera. A group of optical transfer system field lenses would be required in between the detection grid and the objective lens of the digital camera. One surface of the field lens is aspherically designed to balance the spherical aberration and the curvature of field caused by the objective lens, and one surface of the field lens is plano-convex. The function of field lens group is to capture the light rays and refract them as a parallel point source which is well suited to form the full frame image by an objective lens. Finally, the contour image is formed and recorded by the digital camera within a short duration of time. A digitized bitstream signal of contour data is provided for image analyses and generation of 3-dimensional data of the human body.

Thus, in the embodiment, the scanner comprises two objective lenses, with the same focal length and optical design, located in parallel in the same plans. Nodal points of the two lenses are at the same distance from the respective grid planes. Two high-density grid planes have equally spaced identical black and white photographic glass gratings of a density of 17 line pairs per mm for capturing images from a distance of 800 mm. The two grid planes are placed in parallel behind the objective lenses. One grid or grating is for light projection and the other is for image detection.

Figure 4:
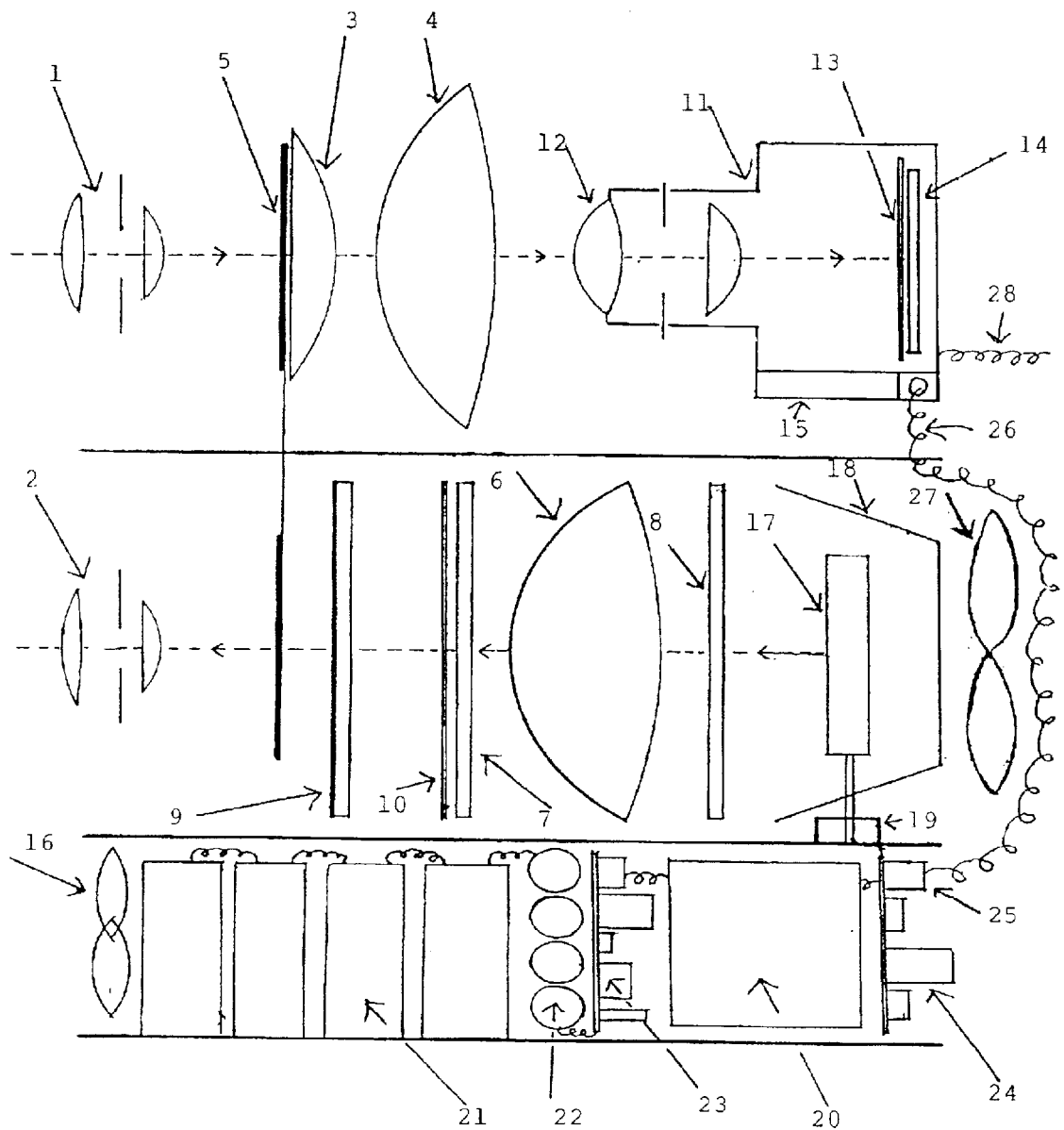
FIG. 4 is a schematic layout showing components of the scanner.

Referring to FIG. 4, the layout of the scanner shows an objective lens 1 for high-density parallel black and white line grid projection towards the human body. An objective lens is arranged to receive the deformed grating image reflected from the human body. An optical transfer system 3, 4 changes the light rays from a non-parallel to a parallel form, which is suitable for another objective lens to capture whole images and reform the images onto a charge-coupled device. The optical transfer system includes two field lenses 3 and 4. The lens 3 is a plano-convex lens made of optical glass with an optical multi-coating (radius=77.52 mm). The lens 4 is a double-convex lens made of PMMA highly transparent optical plastic material; one side of the lens is spherical and the other side is aspherical (respective radius 167.2764 mm and 35.21515). Two grid planes 5 are formed of soda lime optical planar glass providing high density black and white grids of high resolution and high contrast and formed with ultra thin chromium emulsion. Both sides of the grid planes are multi-coated.

A double-convex glass condenser 6 has one spherical side and one aspherical side with a an optical filter 7 and 8 at each side. The filters 7 and 8 are used for absorbing heat and removing ultra-violet light, respectively. The filters increase resolution of the line grid when it is projected onto the surface of the target and prevent heat energy from changing the dimensions of the glass grid. A, planar optical diffusion glass 9 diffuses projected light to prevent hot-spot imaging of a flash tube onto the human body which can be caused by a greater depth of focus when the objective lens works with a small aperture. A honeycomb metal screen 10, with 50% light opacity at its central region and 5% opacity at its edges, balances out an optical vignette caused by the short focal length objective lens 2. The screen produces a more even illumination of the whole image.

A digital camera 11 has an objective lens 12, which can form a maximum of 1:2 close distance, and a high speed $\frac{1}{500}$ second focal plane shutter 13 is used to cut off ambient light. A CCD light sensor 14 is built in at the focal plane of the camera. Analogue to digital encoders and generator 15 supply signals to a personal computer (PC).

A flash unit includes a cooling fan 16 and a U-shaped flash tube 17. The flash tube has a UV coating which can endure 3200-watt power energy and produce 5600° K spectrum light pulses. A flash intensity of 1600 joules produces sufficient light projection with a flash duration of $\frac{1}{1666}$ seconds. An optical reflector 18, made of aluminum, collects and diffuses flash light from a 260 degree angle and reflects the flash light to 100 degree front directional. A ceramic lamp base 19 holds the flash tube 17 and is arranged to receive a power supply via a transformer 20 from DC capacitors 21, 22. There are sixteen capacitors 21 rated at 360V and 1500 microfarads each, and eight capacitors 22 rated at 400 volts and 100 microfarads ach. A rectifier circuit 23, limiting resistor 24 and flash trigger circuits 25 complete a power supply circuit for the flash unit. The flash unit is arranged to selectively produce three levels of intensity of light, namely 400, 800 and 1600 watt seconds.

FIG. 4 also shows a flash synchronisation cable 26, a second cooling fan 27, and a cable 28 for delivering bit stream data signals from the analogue to digital converters 15 to the PC.

The scanner shown in FIG. 4 is typically about 400 mm long, 150 mm wide and 400 mm high and weighs 6.72 kg or 9.6 kg (incl. Nikon D1 camera) and so is easily portable. As mentioned earlier, the data can be captured in less than $\frac{1}{1500}$ second for each exposure in a normal room light environment with 100 to 150 lux illumination. It is also not necessary for the subject to 'pose' for extended periods of time in order for the to 'pictures' to be taken.

We claim:
1. A compact moiré effect body scanner for generating 3-D images, the scanner including;
 a projection module having a pulsed light source producing pulses of light,
 a first objective lens for directing the pulses of light from the pulsed light source along a first central longitudinal axis,
 a first photographic grid for the beam of light and mounted in a plane at right angles to the first central axis to illuminate a body to be scanned, and
 an imaging module adjacent the projection module, having a second central longitudinal axis that is parallel to the first central longitudinal axis, the imaging module incorporating a second objective lens for receiving the pulses of light that are reflected from the body, a second photographic grid for the pulses of light reflected from the body, the second photographic grid being mounted in a plane at right angles to the second central longitudinal axis, and imaging means for recording a deformed grating image, produced by the pulses of light reflected from the body, at a location beyond the second photographic grid.

2. The compact moiré effect body scanner according to claim 1, wherein the imaging means is a digital camera.

3. The compact moiré effect body scanner according to claim 1, wherein the first and second objective lenses have the same focal length and are mounted in a common plane.

4. The compact moiré body scanner according to claim 1, wherein nodal points of the first and second objective lenses are separated by identical distances from the respective photographic grids.

5. The compact moiré effect body scanner according to claim 2, wherein the first and second objective lenses have the same focal length and are mounted in a common plane.

6. The compact moiré body scanner according to claim 2, wherein nodal points of the first and second objective lenses are separated by identical distances from the respective photographic grids.

7. The compact moiré body scanner according to claim 3, wherein nodal points of the first and second objective lenses are separated by identical distances from the respective photographic grids.

8. The compact moiré body scanner according to claim 5, wherein nodal points of the first and second objective lenses are separated by identical distances from the respective photographic grids.

9. The compact moiré effect body scanner according to claim 1 including a planar optical diffusion glass interposed between the pulsed light source and the first objective lens for preventing hot-spot imaging of the body by the pulses of light.

10. A compact moiré effect body scanner for generating 3-D images, the scanner including:

a projection module having a light source producing light, a first objective lens for directing the light from the light source along a first central longitudinal axis, a honeycomb screen, having a larger light opacity in a central region than in a peripheral region, interposed between the light source and the first objective lens, to reduce vignetting, a first photographic grid for the beam of light and mounted in a plane at right angles to the first central axis to illuminate a body to be scanned, and an imaging module adjacent the projection module, having a second central longitudinal axis that is parallel to the first central longitudinal axis, the imaging module incorporating a second objective lens for receiving the light that is reflected from the body, a second photographic grid for the light reflected from the body, the second photographic grid being mounted in a plane at right angles to the second central longitudinal axis, and imaging means for recording a deformed grating image produced by the light reflected from the body, at a location beyond the second photographic grid.

11. The compact moiré effect body scanner according to claim 10, wherein the imaging means is a digital camera.

12. The compact moiré effect body scanner according to claim 10, wherein the first and second objective lenses have the same focal length and are mounted in a common plane.

13. The compact moiré body scanner according to claim 10, wherein nodal points of the first and second objective lenses are separated by identical distances from the respective photographic grids.

14. The compact moiré effect body scanner according to claim 11, wherein the first and second objective lenses have the same focal length and are mounted in a common plane.

15. The compact moiré body scanner according to claim 11, wherein nodal points of the first and second objective lenses are separated by identical distances from the respective photographic grids.

16. The compact moiré body scanner according to claim 12, wherein nodal points of the first and second objective lenses are separated by identical distances from the respective photographic grids.

17. The compact moiré body scanner according to claim 14, wherein nodal points of the first and second objective lenses are separated by identical distances from the respective photographic grids.

18. The compact moiré body scanner according to claim 17, wherein the light source is a pulsed light source producing pulses of light.

19. The compact moiré body scanner according to claim 18, including a planar optical diffusion glass interposed between the pulsed light source and the first objective lens.

\* \* \* \* \*